US010115006B1

(12) United States Patent
Binsaadoon et al.

(10) Patent No.: US 10,115,006 B1
(45) Date of Patent: *Oct. 30, 2018

(54) MOVING PART IMAGE PARTITIONING FOR WALKING GAIT IDENTIFICATION

(71) Applicant: King Fahd University of Petroleum and Minerals, Dhahran (SA)

(72) Inventors: Amer Ghazi Abdullah Binsaadoon, Dhahran (SA); El-Sayed M. El-Alfy, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/008,841

(22) Filed: Jun. 14, 2018

Related U.S. Application Data

(63) Continuation of application No. 15/903,866, filed on Feb. 23, 2018, now Pat. No. 10,032,070, which is a continuation of application No. 15/269,555, filed on Sep. 19, 2016, now Pat. No. 9,984,284.

(60) Provisional application No. 62/276,563, filed on Jan. 8, 2016.

(51) Int. Cl.
*G06K 9/62* (2006.01)
*G06K 9/00* (2006.01)
*G06K 9/46* (2006.01)

(52) U.S. Cl.
CPC ....... *G06K 9/00342* (2013.01); *G06K 9/4671* (2013.01)

(58) Field of Classification Search
CPC .................... G06K 9/00348; A61B 5/112
See application file for complete search history.

(56) References Cited

U.S. PATENT DOCUMENTS 8,331,669 B2   12/2012   Artan et al.

FOREIGN PATENT DOCUMENTS

CN        103473539 A    12/2013

OTHER PUBLICATIONS

A.G.Binsaadoon, et al., "Statistical Gabor-Based Gait Recognition Using Region-Level Analysis" http://uksim.info/ems2015/data/0206a137.pdf, 2015, pp. 137-141.

(Continued)

*Primary Examiner* — Brian Werner
(74) *Attorney, Agent, or Firm* — Oblon, McClelland, Maier & Neustadt, L.L.P.

(57) ABSTRACT

Described herein is an apparatus and method for gait recognition. The apparatus includes circuitry that is configured to receive a gait sequence including a predetermined number of image frames of a subject. The received gait sequence is processed to generate a gait-energy-image (GEI). A plurality of Gabor filter responses is computed by convoluting the generated GEI with a bank of Gabor filters, wherein the filter bank includes a first predetermined number of unique scales, and a second predetermined number of unique orientations. Further, the circuitry is configured to partition, each Gabor filter response of the computed plurality of Gabor filter responses, into a predetermined number of overlapping regions and extract, a predetermined number of statistical features only from the overlapping regions, the extracted statistical features corresponding to texture consent of the subject. The circuitry eventually recognizes the subject based on a classification of the extracted statistical features.

7 Claims, 4 Drawing Sheets

(56) References Cited

OTHER PUBLICATIONS

A. Khan, et al., "Gait recognition progress in recognizing image characteristics" http://vfast.org/journals/index.php/VTCS/article/download/404/416, Jan.-Feb. 2016, vol. 9 Issue. 1, pp. 1-10.
P.R. Deshmukh, et al., "Gait based Human Identification Approach" http://liarcsss.com/docs/papers/Volume_6/2_February2016/V6I2-0238.pdf, Feb. 2016, vol. 6 Issue 2, pp. 495-498.
S. Fazil, et al., "Multi-View Neural Network Based Gait Recognition" http://citeseerx.ist.psu.edu/viewdoc/download?doi=10.1.1.310.5003&rep=rep1&type=pdf, 2010, pp. 705--709.
D. Tao, et al., "General Tensor Discriminant Analysis and Gabor Features for Gait Recognition" IEEE Transactions on Pattern Analysis and Machine Intelligence, vol. 26 No. 10, Oct. 2007, pp. 1700-1715.
M. Hu, et al., "Combining Spatial and Temporal Information for Gait Based Gender Classification" International Conference on Pattern Recognition, 2010, pp. 3679-3682.
C. Chen, et a., "Distance Approximating Dimension Reduction of Riemannian Manifolds" IEEE Transactions on Systems, Man, and Cybernetics—Part B: Cybernetics, vol. 4 No. 1, Feb. 2010, pp. 208-217.
D. Huang, et al., "Gait Recognition based on Gabor wavelets and modified gait energy image for human identification" Journal of Electronic Imaging, vol. 22 Issue. 4 Oct. 2013, pp. 1-12.
X. Yang, et al., "Gait recognition based on dynamic region analysis" Signal Processing, vol. 88. 2008, pp. 2350-2356.
X. Yang, et al., "Gabor-Based Discriminative Common Vectors for Gait Recognition" Congress on Image and Signal Processing, 2008, pp. 191-195.
X. Yang, et al., "Gebor phase based gait recognitincn" Electronics Letters, May 8, 2008, vol. 44 No. 10, Pages.
Dong, Xu, et al., "Human Gait Recognition Using Patch Distribution Feature and Locally-Constrained Group Sparse Representation" IEEE Transactions on Image Processing, vol. 21 No. 1, Jan. 2012, pp. 316-326.
X. Yang, et al., "Gabor-based DCV gait recognition using enhanced gait energy image" https://www.researchgate.net/publication/265329835_Gabor-based_DCV_gait_recognition_using_enhanced_gait_energy_image, Jan. 1988, pp. 1.
Anup Nandy et al., "Cloth invariant gait recognition using pooled segmented statistical features", Neurocomuting 191 (2016) 117-140, Elsevier, Available online Feb. 1, 2016, pp. 117-140 (Year: 2016).
Md. Altab Hossein, "Clothing-invariant gait identification using part-based clothing categorization and adaptive weight control", Pattern Recognition 43 (2010) 2281-2291, Elsevier, pp. 2281, 2291. (Year: 2010).
Xiaochao Yang et al., "Gabor-Based Discriminative Common Vectors for Gait Recognition", 2008 Congress on Image and Signal Processing, IEEE Computer Society, pp. 191-195. (Year: 2008).
Shiqi Yu et al., "A Study on Galt-Based Gender Classification", IEEE Transactlons on Image Processing, vol. 18, No. 8. Aug. 2009, pp. 1905-1910. (Year: 2009).

MOVING PART IMAGE PARTITIONING FOR WALKING GAIT IDENTIFICATION

CROSS-REFERENCE TO RELATED APPLICATIONS

The present application is a Continuation of Ser. No. 15/903,866, now allowed, having a filing date of Feb. 23, 2018, which is a Continuation of Ser. No. 15/269,555, now U.S. Pat. No. 9,984,284, having a filing date of Sep. 19, 2016 and which claims priority to U.S. Provisional Application No. 62/276,563, having a filing date of Jan. 8, 2016 which is incorporated herein by reference in its entirety.

FIELD OF INVENTION

The present disclosure relates generally to a technique of gait recognition based on an analysis of overlapping Gabor-based regions.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Gait recognition is becoming an increasingly popular research problem for human identification based on a walking style of the subject. Gait recognition has emerged as an attractive research problem as it possesses several desirable merits unlike other biometrics. However, most of the existing gait recognition methods (including those that involve Gabor-based filters) suffer from the curse of dimensionality. Some techniques employ a dimensionality reduction process, in order to make the gait recognition process feasible. However, such processes still incur a high computational and storage cost, and further incur difficulties in identifying subjects with a high degree of confidence.

Biometric recognition has been widely used as a powerful tool for automatic human identification and authentication. The gait biometric identifies subjects (i.e. people) by their way of walking. Unlike other biometrics like face and fingerprint, gait recognition does not request the target subject to interact in a predefined and cooperative manner such as being close to the acquisition device or standing at a specific angle. In gait-based systems, the process of image acquisition is non-intrusive. Thus, it can be done in public areas without attracting the attention of subjects under surveillance. Also the system can work at longer distances (e.g. 10 m or more), unlike most of the other biometrics. Moreover, the gait modality is difficult to disguise and can be of low resolution.

Gait recognition processes however have certain limitations. The processes can be greatly affected by a number of conditions like type of shoes, clothes, and the like that are worn by the subject in effectively recognizing the subject. Furthermore, the discriminating power of walking style can also be degraded by certain physical factors such as injuries. Nevertheless, as described by I. Bouchrika et al. in, "Towards automated visual surveillance using gait for identity recognition and tracking across multiple non-intersecting cameras." Multimedia Tools and Applications, 2014, which is incorporated herein by reference in its entirety, gait is still a potential choice for intelligent visual surveillance and tracking of subjects.

Gait recognition processes can be classified broadly in two main categories: model based methods and model-free methods. In model based methods such as those described by D. K. Wagg et al, in "On automated model-based extraction and analysis of gait," proceedings of the 6th IEEE International Conference on Automatic Face and Gesture Recognition, 2004, pp 11-16; C. Yam et al. in, "Automated person recognition by walking and running via model-based approaches," Pattern Recognition, vol. 37, no. 5, pp 1057-1072, 2004; and by L. Wang et al. in, "Automatic gait recognition based on statistical shape analysis," IEEE Transactions on Image Processing, vol. 12, no. 9, pp. 1120-1131, 2003, which are incorporated herein by reference in their entirety, the search for the human movement parameters is usually guided by a statistical or generic model. Here, the frequency and amplitude are typically merged with extracted features, or the collection of images is directly used.

In contrast, the model-free approaches such as those described by J. E. Boyd et al. in "Phase in model-free perception of gait," in Human Motion, 2000, proceedings workshop on, 2000, pp. 3-10, and Y. Dupuis et al. in "Feature subset selection applied to model-free gait recognition." Image and vision computing, vol. 31, no. 8, pp. 580-591, 2013, which are incorporated herein by reference in their entirety, use static and dynamic components. The static components reflect the shape and size of a human body, whereas the dynamic components reflect the movement dynamics. Examples of static features are height, width, stride length, and silhouette bounding box lengths, whereas frequency and phase of movement are examples of dynamic features. Furthermore, model-free techniques may also be classified into temporal and spatio-temporal methods. The research on model-free systems is relatively more than that on model-based systems, because of the computationally tractability.

Temporal gait recognition approaches are expensive in terms of storage and computation due to the frame by frame feature extraction and classification. Gait energy images (GEIs) represent the human walking in a single image conserving motion temporal properties. Several gait recognition approaches rely on features extracted from GEIs. However, such gait recognition processes use reduced-dimensionality GEIs, or apply the feature extraction algorithm on the holistic GEI.

Additionally, Gabor filters have been widely used as an effective feature extraction approach in many fields of research. Such filters have been also utilized in many biometric applications such as iris recognition, and face recognition. However, a main problem incurred with the use of the Gabor filter is the huge dimensionality caused by a convolution process. Few attempts have been proposed for using Gabor filters in gait recognition. For example, the work of Huang et al. "Gait recognition based on Gabor wavelets and modified gait energy image for human identification," Journal of Electronic Imaging, vol. 22, no. 4, October 2013, which is incorporated herein by reference in its entirety, applied a Gabor filter on a modified version of GEI representation. A three-step search (TSS) algorithm was used to prevent the confliction of treating multi-walkers in a silhouette as one person. Adaptive background model was also utilized to alleviate the effect of illumination variance and slow walking. The dimensionality was reduced using PCA and an SVM with RBF-kernel was trained and used for classification.

Accordingly, the present disclosure provides for a framework of gait recognition and characterization, which is not computationally and/or storage wise intensive. The gait recognition technique of the present disclosure provides an efficient and cost-effective manner of recognizing objects.

SUMMARY

An aspect of the present disclosure provides a technique of gait recognition. Specifically, a statistical gait recognition approach is described herein that is based on the analysis of overlapping Gabor-based regions. The Gait Energy Image (GEI) is first constructed from the gait sequence as a spatio-temporal summary. Further, by one embodiment of the present disclosure, the GEI image is convolved with a Gabor filter bank of 8 different orientations and 5 different scales. A statistical analysis is thereafter applied to extract discriminative gait features from multi-overlapped Gabor-based regions. Consecutively, an SVM classifier is utilized to measure the gait similarity and identify the subject.

An aspect of the present disclosure provides for a method of gait recognition, the method comprising: receiving by circuitry a gait sequence, the gait sequence including a predetermined number of image frames of a subject; processing by circuitry, the received gait sequence to generate a gait-energy-image (GEI); computing by circuitry, a plurality of Gabor filter responses by convoluting the generated GEI with a bank of Gabor filters, the filter bank including a first predetermined number of unique scales, and a second predetermined number of unique orientations, partitioning by circuitry, each Gabor filter response of the computed plurality of Gabor filter responses, into a predetermined number of overlapping regions; extracting by circuitry, a predetermined number of statistical features only from the overlapping regions, the extracted statistical features corresponding to texture content of the subject; and recognizing by circuitry, the subject based on a classification of the extracted statistical features.

Another aspect of the present disclosure provides for a non-transitory computer readable medium having stored thereon a program that when executed by a computer causes the computer to execute a method of gait recognition, the method comprising: receiving a gait sequence, the gait sequence including a predetermined number of image frames of a subject; processing the received gait sequence to generate a gait-energy-image (GEI); computing a plurality of Gabor filter responses by convoluting the generated GEI with a bank of Gabor filters, the filter bank including a first predetermined number of unique scales, and a second predetermined number of unique orientations, partitioning by circuitry, each Gabor filter response of the computed plurality of Gabor filter responses, into a predetermined number of overlapping regions; extracting a predetermined number of statistical features only from the overlapping regions, the extracted statistical features corresponding to texture content of the subject; and recognizing the subject based on a classification of the extracted statistical features.

According to another aspect of the present disclosure is provided an apparatus comprising: circuitry configured to receive a gait sequence, the gait sequence including a predetermined number of image frames of a subject; process the received gait sequence to generate a gait-energy-image (GEI); compute a plurality of Gabor filter responses by convoluting the generated GEI with a bank of Gabor filters, the filter bank including a first predetermined number of unique scales, and a second predetermined number of unique orientations, partition each Gabor filter response of the computed plurality of Gabor filter responses, into a predetermined number of overlapping regions; extract a predetermined number of statistical features only from the overlapping regions, the extracted statistical features corresponding to texture content of the subject; and recognize the subject based on a classification of the extracted statistical features.

The foregoing paragraphs have been provided by way of general introduction, and are not intended to limit the scope of the following claims. The described embodiments together, with further advantages, will be best understood by reference to the following detailed description taken in conjunction with the accompanying drawings.

BRIEF DESCRIPTION OF THE DRAWINGS

Various embodiments of this disclosure that are provided as examples will be described in detail with reference to the following figures, wherein like numerals reference like elements, and wherein.

DETAILED DESCRIPTION OF EMBODIMENTS

Figure 1A:
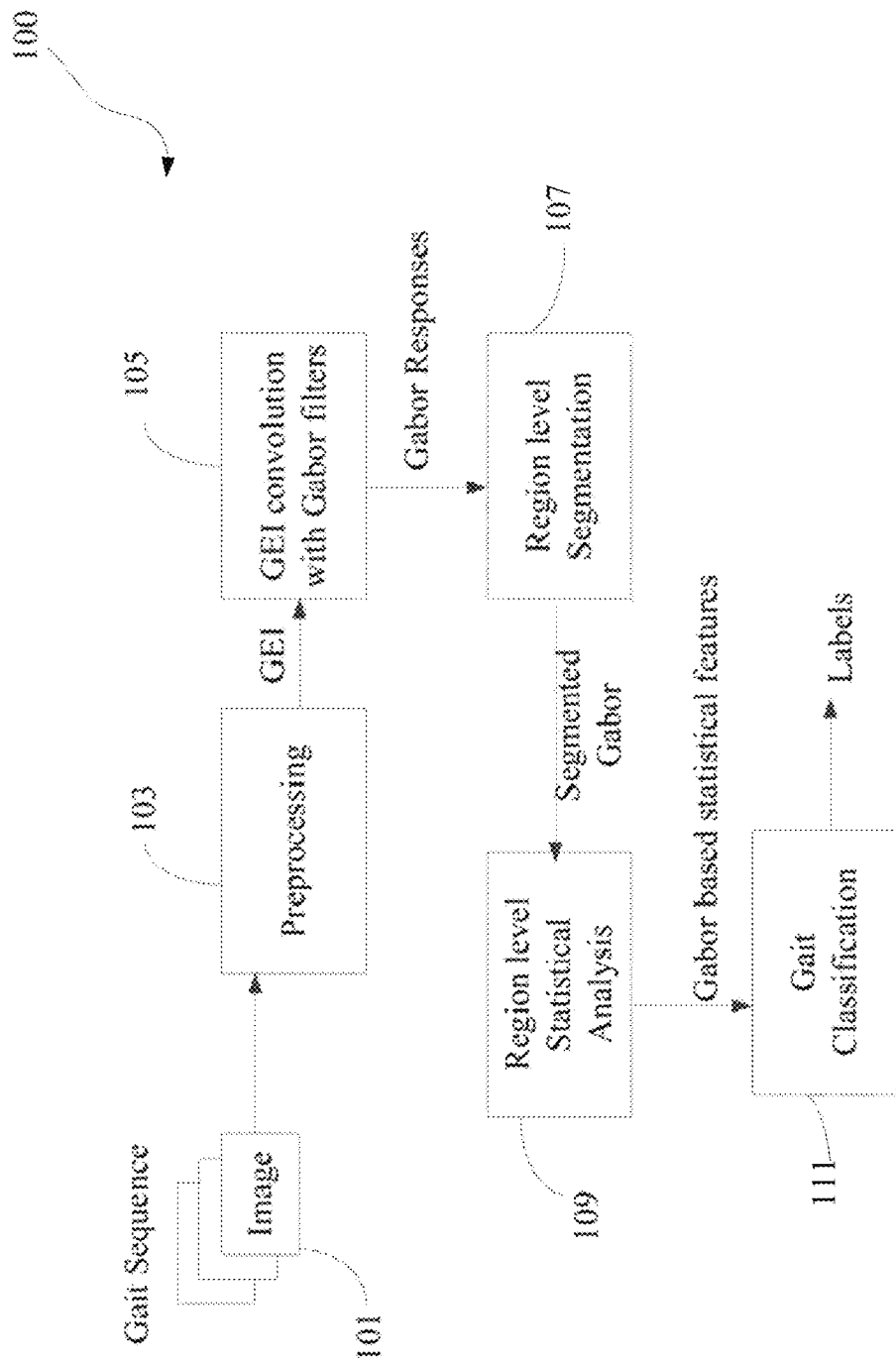
FIG. 1A depicts an exemplary flowchart illustrating the steps performed in gait recognition by one embodiment.

Exemplary embodiments are illustrated in the referenced figures of the drawings. It is intended that the embodiments and figures disclosed herein are to be considered illustrative rather than restrictive. No limitation on the scope of the technology and of the claims that follow is to be imputed to the examples shown in the drawings and discussed herein.

By one embodiment of the present disclosure is provided a methodology for gait recognition. The method is based on the generation of GEI and Gabor filters. However, unlike earlier Gabor-based approaches for gait recognition, which mainly utilize the whole Gabor responses, the method according to an embodiment, applies statistical feature extraction only in overlapping regions.

Turning to FIG. 1A is depicted an exemplary flowchart 100 depicting the steps performed in gait recognition by one embodiment of the present disclosure.

A sequences of images (i.e. a gait sequence) 101 is preprocessed 103 to generate a GEI image. For instance, by one embodiment. Gait Energy Image (GEI) is a sum of images of a walking silhouette divided by the number of images. GEI is a useful representation with superior selective power and strength against segmental errors. The GEI image can be computed by pre-processing a binary gait silhouette images $B_t$ (x, y) at time t in a sequence. GEI is computed as:

$$GEI(x, y) = \frac{1}{N}\sum_{t-1}^{N} Bt(x, y),$$

where N is the number of frames in the full gait cycle and x and y are spatial coordinates of pixels in the image.

The generated GEI image (from the output of 103) is convolved with a bank of Gabor filters 105. Specifically, circuitry (described later with reference to FIG. 3) that is included in an image processing device may be configured to perform a convolution operation of the generated GEI image and the Gabor bank of filters.

By one embodiment, the GEI gait image is represented as a function GEI(x,y), which is convolved with a bank of Gabor filters (i.e., a convolution operation of the GEI gait image is performed with respect to the Gabor filters). The filter bank has 5 different scales and 8 different orientations. The result of the convolution process can be expressed as:

$$G_{\upsilon,\mu}(x,y) = GEI(x,y) * \psi_{\upsilon,\mu}(x,y) \qquad (1)$$

where * represents convolution. $\psi_{\upsilon,\mu}(x,y)$ is a 2D Gabor wavelet kernel function at orientation $\mu$ and scale $\upsilon$, and $G_{\upsilon,\mu}(x,y)$ represents the convolution output. The kernel is defined as:

$$\psi_{v,\mu}(z) = \frac{\|k_{v,\mu}\|^2}{\sigma^2} e^{-(\|k_{v,\mu}\|^2 \|z\|^2 / 2\sigma^2)} \left[ e^{ik_{v,\mu} z} - e^{-\sigma^2/2} \right] \qquad (2)$$

where z=(x,y), $\|\bullet\|$ is the Euclidean norm operator, $k_{\upsilon,\mu} = k_\upsilon e^{i\varphi_\mu}$ with $k_\upsilon = k_{max}/\lambda^\upsilon$, $\lambda$ is the spacing factor between FIG. 1A Gabor wavelets in the frequency domain, and $\varphi_\mu$ is the orientation. The Gabor response includes two portions: a real part $R_{\upsilon,\mu}(x,y)$, and an imaginary part $Im_{\upsilon,\mu}(x,y)$. By one embodiment, the magnitude of the Gabor response is used in gait recognition. The magnitude can be computed as follows:

$$Mag_{\upsilon,\mu}(x,y) = \sqrt{R_{\upsilon,\mu}^2(x,y) + Im_{\upsilon,\mu}^2(x,y)} \qquad (3)$$

Figure 2:
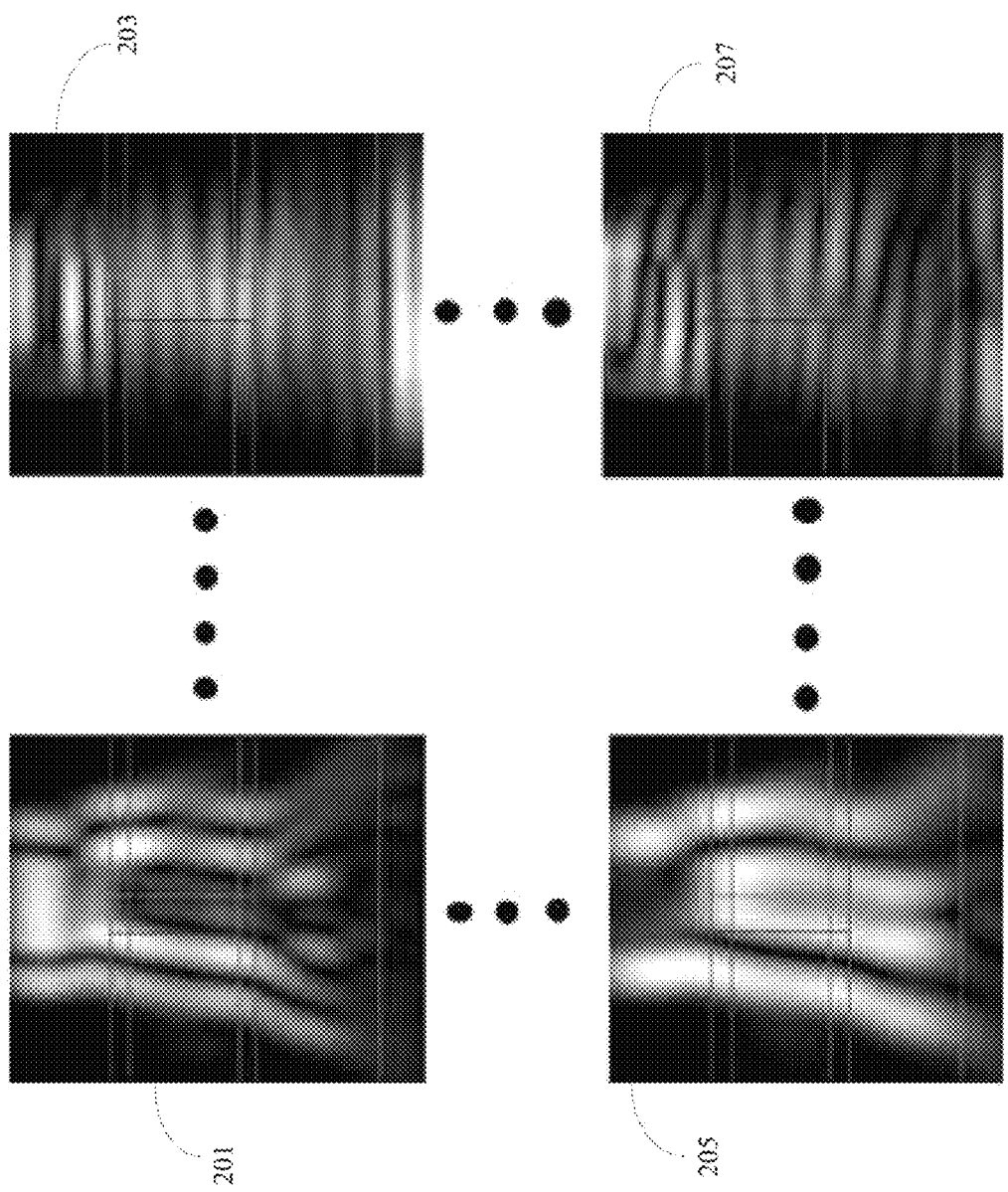
FIG. 2 depicts an exemplary Gabor patterns including overlapping regions.

Further, the convolution operation in 105 results in a plurality of Gabor responses. Each response of the plurality of Gabor responses is partitioned into a predefined number of unique (i.e., different sized) overlapping regions. For instance, by one embodiment, in order to capture as much discriminative gait information as possible, the obtained 40 Gabor responses (corresponding to a Gabor filter including 5 different scales and 8 different orientations) are partitioned into predefined different-sized overlapping regions. By one embodiment, different partitioning scenarios may be attempted to test which partitioning is more effective to gait applications. An exemplary overlapping of regions of Gabor patterns is depicted in FIG. 2. Specifically, FIG. 2 depicts an example of a Gabor response partitioning (201, 203, 205, and 207) of 5 main overlapping body regions. Each colored line represents a boundary of a region. The length of the common area between each two adjacent regions can be set to a predetermined number of pixels such as 10 pixels.

Turning back to FIG. 1A, upon segmentation of the Gabor responses being complete, a region-level statistical analysis is performed only on the overlapping regions of the Gabor responses in 109.

Figure 1B:
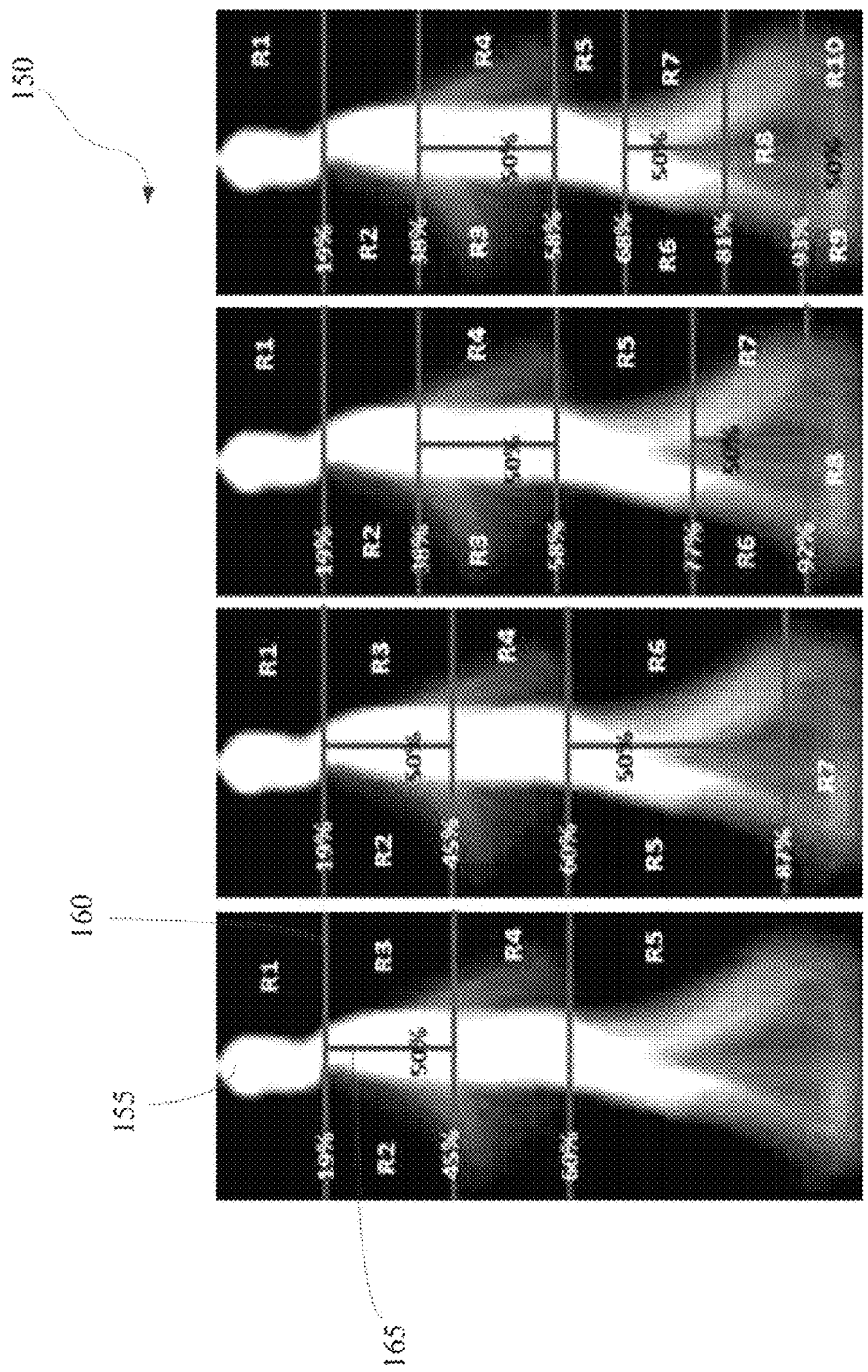
FIG. 1B depicts exemplary boundaries achieved by a segmentation process.

By one embodiment, partitioning is conducted as depicted in FIG. 1B. Specifically, FIG. 1B depicts the partitioning 150 of a sequence of images. The portioning is performed as a fraction of the subject's 155 height and width, and is denoted by horizontal and vertical lines, 160 and 165 respectively. The underlying idea is to separate moving parts such as head, arms, legs, etc. After normalization and alignment of GEI, the boundaries between regions are set. For instance, the head part is set to include about 19% of the whole subject's height, and 10 pixels are set as the length of the common area between each two adjacent regions.

By one embodiment, in the Gabor based gait feature extraction process, the features of mean (average) and a standard deviation are extracted from the overlapping regions only, to describe the gait. However, these two statistical features may not be enough, and may lead to the loss of important gait information in the Gabor patterns. Consequently, by one embodiment, a total of 6 more statistical features are utilized to capture the texture content which participates in notable improvement of the overall gait recognition performance.

Specifically, statistical features are extracted from each overlapping region of each Gabor pattern. Further, the obtained set of features is merged to form a global feature vector that is to be used in training and classification. By one embodiment, using a normalized co-occurrence matrix, represented as $p_{i,j}$, the utilized statistical features are as follows:

Energy: measures the uniformity of an image as follows:

$$E = \sum_{i,j} p_{i,j}^2 \qquad (4)$$

Correlation: measures to what level a pixel in an image are correlated to its neighbors; it is given by:

$$Cor = \sum_{i,j} \frac{(i - \mu_i)(j - \mu_j) p_{ij}}{\sigma_i \sigma_j} \qquad (5)$$

Contrast: measures the intensity local variation in the co-occurrence matrix:

$$Con = \sum_{i,j} (i - j) p_{i,j} \qquad (6)$$

Entropy: measures randomness or disorder of an image. Highest value is obtained when all intensities are the same. It is given by;

$$Ent = -\sum_{i,j} p_{i,j} \log_2 p_{i,j} \qquad (7)$$

Homogeneity: measures the spatial closeness of the distribution of elements in an image:

$$Hom = \sum_{i,j} \frac{p_{i,j}}{1 + |i - j|} \qquad (8)$$

Smoothness: measures the number of times the density function can be differentiated:

$$Smo = 1 - \frac{1}{\sigma^2} \qquad (9)$$

Furthermore, by one embodiment, in the gait classification step of FIG. 1A, a support vector machine (SVM) classifier with a linear kernel is used for gait recognition using the extracted feature vectors, whereafter the process as depicted in FIG. 1A terminates.

By one embodiment, SVMs are a set of supervised learning methods used for classification, regression and outlier detection. Utilizing SVMs provides the advantageous ability of being effective in high dimensional spaces, effective in cases where number of dimensions is greater than the number of samples, using a subset of training points in the decision function (called support vectors), so it is also memory efficient, and being versatile, i.e., different kernel functions can be specified for the decision function.

By one embodiment, the gait recognition method as described with reference to FIG. 1A, is evaluated on the CASIA B gait database as described by S. Yu et al. in, "A framework for evaluating the effect of view angle, clothing and carrying condition on gait recognition," in Proceedings of the 18th International Conference on Pattern Recognition (ICPR), vol. 4, 2006. pp. 441-444, and incorporated herein by reference in its entirety. The database includes sequence samples of 124 subjects including 93 males and 31 females.

By one embodiment, gait sequences for each subject are captured from 11 different views. Each subject walks 10 times through a straight line of concrete ground (6 normal walking, 2 wearing a coat, and 2 carrying a bag). At each walking instance, there are 11 cameras capturing the subject walking. Consequently, each subject has a total of 110 video sequences and the database includes 110×124=13640 total sequences for all subjects.

By one embodiment, the CASIA B database is divided into three test sets: normal walking, carrying a bag, and wearing a coat. The division of the database provisions for testing the gait recognition approach of the present disclosure to identify subjects under different scenarios. Firstly, the gait recognition method of the present disclosure (referred to herein after as 'GR method' is applied on the Gabor patterns without any partitioning. Tables I, II, and III depict the recognition rates of the GR method and illustrate a comparison of the GR method to other implemented methods for the three scenarios. It must be appreciated that all comparisons are conducted in terms of recognition rate. The results as shown in Tables I, II, and III demonstrate that the statistical approach of the GR method outperforms all other methods under all scenarios. Moreover, the performance of the GR method is superior in the case of probe of subjects wearing coat.

TABLE I

Comparison of correct classification rates (CCR) to Normal Walking senario of CASIA B without partitioning

| Angie (φ) | pHOG | LXP | LBP | SLBP | Mean + std | GR-Method |
|---|---|---|---|---|---|---|
| 0 | 82.76 | 61.64 | 56.9 | 68.54 | 88.79 | 95.26 |
| 18 | 74.57 | 61.21 | 66.81 | 65.52 | 86.64 | 97.41 |
| 36 | 76.72 | 53.02 | 60.35 | 61.21 | 76.29 | 91.38 |
| 54 | 76.72 | 56.04 | 56.9 | 63.79 | 79.31 | 92.24 |
| 72 | 81.47 | 60.78 | 68.54 | 68.54 | 84.91 | 91.81 |
| 90 | 86.21 | 62.07 | 73.28 | 68.97 | 80.6 | 93.1 |
| 108 | 81.04 | 63.36 | 68.97 | 65.52 | 83.19 | 93.97 |
| 126 | 77.59 | 57.33 | 62.5 | 68.54 | 81.9 | 91.81 |
| 144 | 76.72 | 57.33 | 61.21 | 66.81 | 79.74 | 91.38 |
| 162 | 78.45 | 63.79 | 68.97 | 75.43 | 83.19 | 92.24 |
| 180 | 83.62 | 53.02 | 57.33 | 66.38 | 87.07 | 95.26 |

TABLE II

Comparison of correct classification rates (CCR.) for Carrying Bag scenario of CASIA B without partitioning.

| Angle (φ) | pHOG | LXP | LBP | SLBP | Mean + std | GR-Method |
|---|---|---|---|---|---|---|
| 0 | 45.26 | 26.72 | 28.02 | 28.45 | 45 | 64.66 |
| 18 | 30.6 | 18.54 | 43.1 | 28.88 | 40.09 | 48.28 |

TABLE II-continued

Comparison of correct classification rates (CCR.) for Carrying Bag scenario of CASIA B without partitioning.

| Angle (φ) | pHOG | LXP | LBP | SLBP | Mean + std | GR-Method |
|---|---|---|---|---|---|---|
| 36 | 30.6 | 15.95 | 34.05 | 23.71 | 36.64 | 48.28 |
| 54 | 24.57 | 15.95 | 30.6 | 25 | 25 | 33.19 |
| 72 | 20.26 | 9.91 | 34.05 | 29.74 | 30.6 | 42.67 |
| 90 | 22.41 | 18.54 | 37.5 | 35.78 | 25.86 | 40.52 |
| 108 | 18.54 | 18.1 | 34.48 | 31.04 | 25 | 43.1 |
| 126 | 21.98 | 18.1 | 31.47 | 26.72 | 26.72 | 37.5 |
| 144 | 20.26 | 8.62 | 28.02 | 31.9 | 30.6 | 44.4 |
| 162 | 35.78 | 21.55 | 35.35 | 27.16 | 35.35 | 50.43 |
| 180 | 42.67 | 20.69 | 29.74 | 28.45 | 46.98 | 59.91 |

TABLE III

Comparison of correct classification rates (CCR) for Wearing Coat scenario of CASIA B without partitioning.

| Angle (φ) | pHOG | LXP | LBP | SLBP | Mean + std | GR-Method |
|---|---|---|---|---|---|---|
| 0 | 12.93 | 7.33 | 9.91 | 7.33 | 15.09 | 17.67 |
| 18 | 13.79 | 9.05 | 9.91 | 12.07 | 15.95 | 19.4 |
| 36 | 12.07 | 7.33 | 15.95 | 13.79 | 15.52 | 25 |
| 54 | 9.05 | 12.07 | 18.1 | 11.64 | 14.66 | 23.28 |
| 72 | 9.48 | 12.07 | 16.38 | 12.07 | 13.79 | 37.5 |
| 90 | 8.19 | 6.47 | 15.09 | 13.79 | 12.5 | 34.48 |
| 108 | 9.48 | 9.48 | 13.79 | 11.64 | 15.09 | 38.36 |
| 126 | 10.78 | 9.48 | 17.24 | 13.36 | 12.93 | 24.57 |
| 144 | 11.21 | 13.79 | 10.78 | 11.21 | 10.78 | 19.83 |
| 162 | 13.79 | 7.33 | 10.78 | 12.07 | 7.76 | 14.66 |
| 180 | 12.93 | 6.9 | 11.21 | 7.33 | 10.35 | 17.67 |

In the Tables I, II, and III, as depicted above, the LBP method and SLBP method are described by X. Yang et al. in, "Gait recognition based on dynamic region analysis." Signal Processing, vol. 88, no. 9, pp. 2350-2356, 2008, and by W. Zhang et al. in, "Local Gabor binary pattern histogram sequence: a novel non-statistical model for face representation and recognition," in Tenth IEEE International Conference on Computer Vision (ICCV), vol. 1, October 2005, pp. 786-791 Vol. 1, which are both incorporated herein by reference in their entirety.

Additionally, in order to evaluate the effect of partitioning on the recognition rate, a group of experiments for the cases of non-overlapping partitioning and overlapping portioning techniques were performed for the above described three scenarios. The results for the non-overlapping partitioning are depicted below in Tables IV, V, and VI, respectively. Furthermore, the results for the overlapping partitioning scenario are depicted below in Tables VII, VIII, and IX. The results demonstrate an improvement in the performance of gait recognition, when partitioning is applied, with a slightly higher performance for the case of overlapping partitioning.

TABLE IV comparison of correct classification rates (CCR) for Normal Walking of CASIA B with different non-overlapping partitioning.

| Angle (φ) | Holistic | 5 regions | 7 regions | 8 regions | 10 regions | 16 regions |
|---|---|---|---|---|---|---|
| 0 | 95.26 | 99.14 | 99.14 | 99.14 | 99.14 | 98.28 |
| 18 | 97.41 | 98.71 | 98.71 | 99.57 | 99.57 | 99.14 |
| 36 | 91.38 | 97.41 | 97.41 | 97.85 | 97.85 | 96.12 |
| 54 | 92.24 | 98.71 | 97.41 | 97.85 | 97.41 | 96.55 |
| 72 | 91.81 | 96.98 | 97.41 | 97.85 | 97.85 | 96.55 |
| 90 | 93.1 | 97.41 | 98.71 | 98.71 | 99.14 | 97.85 |
| 108 | 93.97 | 98.71 | 98.71 | 99.14 | 99.14 | 97.41 |

TABLE IV-continued comparison of correct classification rates (CCR) for Normal Walking of CASIA B with different non-overlapping partitioning.

| Angle (φ) | Holistic | 5 regions | 7 regions | 8 regions | 10 regions | 16 regions |
|---|---|---|---|---|---|---|
| 126 | 91.81 | 99.14 | 98.71 | 98.28 | 98.71 | 97.85 |
| 144 | 91.38 | 96.98 | 96.55 | 97.41 | 97.41 | 95.69 |
| 162 | 92.24 | 98.28 | 97.41 | 97.41 | 97.41 | 96.12 |
| 180 | 95.26 | 97.41 | 96.98 | 98.71 | 98.28 | 97.85 |

TABLE V comparison of correct classification rates (CCR) for Carrying Bag of CASIA B with different non-overlapping partitioning.

| Angle (φ) | Holistic | 5 regions | 7 regions | 8 regions | 10 regions | 16 regions |
|---|---|---|---|---|---|---|
| 0 | 64.66 | 68.1 | 69.83 | 68.1 | 69.83 | 65.09 |
| 18 | 48.28 | 56.47 | 58.62 | 54.74 | 52.16 | 47.85 |
| 36 | 48.28 | 53.45 | 50.43 | 52.59 | 50.86 | 52.16 |
| 54 | 33.19 | 56.9 | 56.47 | 64.66 | 62.5 | 51.29 |
| 72 | 42.67 | 56.9 | 46.12 | 54.74 | 46.98 | 41.38 |
| 90 | 40.52 | 55.6 | 46.98 | 47.85 | 41.38 | 37.5 |
| 108 | 43.1 | 55.17 | 44.83 | 48.28 | 39.66 | 40.95 |
| 126 | 37.5 | 47.85 | 41.81 | 42.67 | 42.24 | 43.1 |
| 144 | 44.4 | 56.47 | 40.95 | 47.41 | 40.95 | 46.55 |
| 162 | 50.43 | 60.35 | 56.9 | 57.76 | 56.47 | 61.64 |
| 180 | 59.91 | 68.97 | 69.83 | 67.67 | 65.52 | 65.09 |

TABLE VI comparison of correct classification rates (CCR) for Wearing Coat of CASIA B with different non-overlapping partitioning.

| Angle (φ) | Holistic | 5 regions | 7 regions | 8 region | 10 regions | 16 regions |
|---|---|---|---|---|---|---|
| 0 | 17.67 | 25 | 37.07 | 39.66 | 43.1 | 34.91 |
| 18 | 19.4 | 20.26 | 29.31 | 39.66 | 43.97 | 31.04 |
| 36 | 25 | 27.16 | 31.9 | 37.07 | 42.24 | 31.9 |
| 54 | 23.28 | 26.29 | 36.21 | 43.97 | 50.86 | 40.52 |
| 72 | 37.5 | 33.19 | 39.22 | 50 | 50.43 | 40.52 |
| 90 | 34.48 | 35.78 | 39.22 | 44.4 | 46.12 | 30.17 |
| 108 | 38.36 | 35.35 | 42.67 | 49.14 | 46.12 | 31.9 |
| 126 | 24.57 | 26.29 | 33.62 | 42.67 | 45.69 | 31.9 |
| 144 | 19.83 | 25 | 32.76 | 35.78 | 41.38 | 26.72 |
| 162 | 14.66 | 23.71 | 31.04 | 38.79 | 39.66 | 30.17 |
| 180 | 17.67 | 28.45 | 36.21 | 43.1 | 50 | 33.19 |

TABLE VIII comparison of correct classification rates (CCR) for Normal Walking of CASIA B with different overlapping partitioning.

| Angle (φ) | Holistic | 5 regions | 7 regions | 8 regions | 10 regions | 16 regions |
|---|---|---|---|---|---|---|
| 0 | 95.26 | 98.28 | 98.71 | 98.28 | 97.85 | 98.28 |
| 18 | 97.41 | 97.85 | 99.14 | 99.14 | 98.28 | 99.14 |
| 36 | 91.38 | 96.98 | 96.98 | 96.98 | 96.55 | 96.12 |
| 54 | 92.24 | 97.41 | 97.41 | 97.41 | 96.98 | 96.98 |
| 72 | 91.81 | 97.85 | 96.98 | 96.98 | 96.98 | 96.55 |
| 90 | 93.1 | 97.41 | 98.71 | 98.71 | 98.28 | 98.28 |
| 108 | 93.97 | 98.28 | 98.28 | 98.71 | 98.28 | 97.85 |
| 126 | 91.81 | 98.28 | 98.28 | 97.85 | 97.41 | 98.28 |
| 144 | 91.38 | 95.26 | 95.69 | 96.12 | 95.69 | 96.55 |
| 162 | 92.24 | 94.83 | 95.26 | 96.55 | 95.69 | 96.55 |
| 180 | 95.26 | 96.98 | 96.98 | 97.41 | 97.41 | 97.41 |

TABLE VIII comparison of correct classification rates (CCR) for Carrying Bag of CASIA B with different overlapping partitioning.

| Angle (φ) | Holistic | 5 regions | 7 regions | 8 regions | 10 regions | 16 regions |
|---|---|---|---|---|---|---|
| 0 | 64.66 | 66.38 | 61.21 | 65.09 | 63.79 | 70.69 |
| 18 | 48.28 | 45.69 | 49.57 | 53.02 | 48.71 | 53.45 |
| 36 | 48.28 | 53.02 | 48.28 | 50 | 46.55 | 51.29 |
| 54 | 33.19 | 51.72 | 56.04 | 58.62 | 55.17 | 53.02 |
| 72 | 42.67 | 50 | 38.36 | 43.54 | 37.93 | 45.69 |
| 90 | 40.52 | 44.83 | 37.5 | 44.83 | 39.22 | 41.38 |
| 108 | 43.1 | 48.28 | 37.5 | 40.52 | 37.07 | 41.38 |
| 126 | 37.5 | 42.24 | 39.22 | 43.1 | 43.1 | 43.97 |
| 144 | 44.4 | 46.98 | 40.95 | 43.1 | 40.09 | 48.71 |
| 162 | 50.43 | 58.62 | 52.59 | 58.19 | 55.17 | 62.07 |
| 180 | 59.91 | 62.93 | 57.76 | 69.83 | 64.66 | 66.81 |

TABLE IX comparison of correct classification rates (CCR) for Wearing Coat of CASIA B with different overlapping partitioning.

| Angle (φ) | Holistic | 5 regions | 7 regions | 8 regions | 10 regions | 16 regions |
|---|---|---|---|---|---|---|
| 0 | 17.67 | 20.69 | 25 | 32.76 | 34.91 | 33.62 |
| 18 | 19.4 | 17.67 | 23.71 | 31.47 | 33.62 | 32.76 |
| 36 | 25 | 22.41 | 27.59 | 32.76 | 36.21 | 32.33 |
| 54 | 23.28 | 25.86 | 32.33 | 39.66 | 46.55 | 38.79 |
| 72 | 37.5 | 28.89 | 33.19 | 41.38 | 40.52 | 39.22 |
| 90 | 34.48 | 28.45 | 31.47 | 38.79 | 41.81 | 32.76 |
| 108 | 38.36 | 29.31 | 34.48 | 43.97 | 43.54 | 33.62 |
| 126 | 24.57 | 23.71 | 29.31 | 37.93 | 38.79 | 31.47 |
| 144 | 19.83 | 23.28 | 26.72 | 31.04 | 33.19 | 29.31 |
| 180 | 17.67 | 22.85 | 32.76 | 39.66 | 40.95 | 35.35 |

Accordingly, by one embodiment of the present disclosure, the GEIs images of CASIA B dataset are convolved with a Gabor filter bank to obtain the Gabor-based gait representation. Further, these Gabor patterns are partitioned into non-overlapping and overlapping regions in order to enhance and preserve as much discriminative gait information as possible. Finally, several statistical features are investigated which include at least the mean and standard deviation. Results illustrated in Tables I-IX above indicate that the GR method of gait recognition as described herein outperforms several other methods. Moreover, the results demonstrate that using overlapping partitioning can further enhance the performance of gait recognition. Furthermore, the highlighted cells in the above Tables I-IX depict the enhanced performance of the gait recognition method of the present disclosure.

By one embodiment, several experiments are conducted on another dataset, OU-ISIR-a Gait Database, and the performance of the gait recognition technique described herein is compared against five additional methods for gait feature extraction. The dataset is a collection of gait videos of 34 persons walking on a treadmill from side view with of nine different speeds from 2 km/h to 10 km/h at 1 km/h interval. Each person has two sequences: one for "gallery" and one for "probe" at each speed.

The OU-ISIR is maintained by the Institute of Scientific and Industrial Research (ISIR), Osaka University (OU) "H. Iwama, M. Okumuro, Y. Makihara and Y. Yagi, "The OU-ISIR Gait Database Comprising the Large Population Dataset and Performance Evaluation of Gait Recognition," IEEE Transactions on Information Forensics and Security, vol. 7, no. 5, pp. 1511-1521, October 2012.", and incorporated herein by reference in its entirely.

In what follows, Tables X-XIII illustrate the performance of the gait recognition technique describe herein. Results demonstrate that the statistical approach described herein outperforms all other methods under most speeds and uses four performance measures. To evaluate the effect of partitioning on the performance, a group of experiments is designed. By one embodiment, correct classification rate (CCR) performance measure is used to test the level of improvement that can be obtained using partitioning. For non-overlapping partitioning, the results are shown in Table XIV. Similarly, for overlapping partitioning, the results are shown in Tables XV. The results demonstrate improvement in the performance when partitioning is applied, with an edge for overlapping.

TABLE X

Comparison of correct classification rates (CCR) under different walking speeds using OU-ISIR-A database without partitioning.

| Speed (km/h) | pHOG | LXP | LBP | SLBP | GEI | GEI + PCA | LGXP | LGBP | SLGBP | Mean + std | proposed |
|---|---|---|---|---|---|---|---|---|---|---|---|
| 2 | 91.17 | 67.64 | 73.52 | 67.64 | 94.11 | 94.11 | 88.23 | 91.17 | 91.17 | 91.17 | 94.12 |
| 3 | 88.23 | 55.88 | 67.64 | 61.76 | 91.17 | 94.11 | 85.29 | 91.17 | 88.23 | 88.23 | 100 |
| 4 | 82.35 | 52.94 | 64.7 | 55.88 | 97.05 | 94.11 | 79.41 | 82.35 | 88.23 | 91.17 | 94.11 |
| 5 | 76.47 | 38.23 | 64.7 | 47.05 | 85.29 | 94.11 | 88.23 | 88.23 | 91.17 | 88.23 | 94.11 |
| 6 | 82.35 | 47.05 | 58.82 | 55.88 | 88.23 | 88.23 | 85.29 | 97.05 | 94.11 | 91.17 | 97.05 |
| 7 | 91.17 | 32.35 | 58.82 | 44.11 | 85.29 | 88.23 | 82.35 | 79.41 | 85.29 | 91.17 | 94.11 |
| 8 | 91.17 | 47.05 | 61.76 | 67.64 | 85.29 | 91.17 | 82.35 | 88.23 | 91.17 | 85.29 | 91.17 |
| 9 | 94.11 | 47.05 | 61.76 | 55.88 | 79.41 | 82.35 | 79.41 | 88.23 | 82.35 | 76.47 | 82.35 |
| 10 | 91.17 | 50 | 79.41 | 64.7 | 91.17 | 91.17 | 82.35 | 91.17 | 82.35 | 82.35 | 91.17 |

TABLE XI

Comparison of precisions under different walking speeds using OU-ISIR-A database without partitioning.

| Speed (km/h) | pHOG | LXP | LBP | SLBP | GEI | GEI + PCA | LGXP | LGBP | SLGBP | Mean + std | proposed |
|---|---|---|---|---|---|---|---|---|---|---|---|
| 2 | 0.86 | 0.59 | 0.64 | 0.53 | 0.91 | 0.91 | 0.82 | 0.86 | 0.87 | 0.87 | 0.91 |
| 3 | 0.82 | 0.45 | 0.54 | 0.52 | 0.88 | 0.91 | 0.78 | 0.89 | 0.83 | 0.82 | 1 |
| 4 | 0.75 | 0.43 | 0.53 | 0.49 | 0.95 | 0.91 | 0.7 | 0.74 | 0.83 | 0.88 | 0.91 |
| 5 | 0.69 | 0.26 | 0.51 | 0.35 | 0.8 | 0.91 | 0.82 | 0.82 | 0.86 | 0.83 | 0.91 |
| 6 | 0.75 | 0.36 | 0.47 | 0.45 | 0.83 | 0.82 | 0.8 | 0.95 | 0.92 | 0.87 | 0.95 |
| 7 | 0.87 | 0.25 | 0.48 | 0.36 | 0.77 | 0.82 | 0.73 | 0.74 | 0.77 | 0.86 | 0.91 |
| 8 | 0.87 | 0.37 | 0.47 | 0.57 | 0.79 | 0.86 | 0.79 | 0.83 | 0.86 | 0.8 | 0.86 |
| 9 | 0.91 | 0.36 | 0.51 | 0.45 | 0.72 | 0.76 | 0.74 | 0.84 | 0.77 | 0.67 | 0.73 |
| 10 | 0.86 | 0.4 | 0.7 | 0.52 | 0.86 | 0.89 | 0.75 | 0.87 | 0.74 | 0.76 | 0.86 |

TABLE XII

Comparison of Recalls under different walking speeds using OU-ISIR-A database without partitioning.

| Speed (km/h) | pHOG | LXP | LBP | SLBP | GEI | GEI + PCA | LGXP | LGBP | SLGBP | Mean + std | proposed |
|---|---|---|---|---|---|---|---|---|---|---|---|
| 2 | 0.91 | 0.67 | 0.73 | 0.67 | 0.94 | 0.94 | 0.88 | 0.91 | 0.91 | 0.91 | 0.94 |
| 3 | 0.88 | 0.55 | 0.67 | 0.61 | 0.91 | 0.94 | 0.85 | 0.91 | 0.88 | 0.88 | 1 |
| 4 | 0.82 | 0.52 | 0.64 | 0.55 | 0.97 | 0.94 | 0.79 | 0.82 | 0.88 | 0.91 | 0.94 |
| 5 | 0.76 | 0.38 | 0.64 | 0.47 | 0.85 | 0.94 | 0.88 | 0.88 | 0.91 | 0.88 | 0.94 |
| 6 | 0.82 | 0.47 | 0.58 | 0.55 | 0.88 | 0.88 | 0.85 | 0.97 | 0.94 | 0.91 | 0.97 |
| 7 | 0.91 | 0.32 | 0.58 | 0.44 | 0.85 | 0.88 | 0.82 | 0.79 | 0.85 | 0.91 | 0.94 |
| 8 | 0.91 | 0.47 | 0.61 | 0.67 | 0.85 | 0.91 | 0.82 | 0.88 | 0.91 | 0.85 | 0.91 |
| 9 | 0.94 | 0.47 | 0.61 | 0.55 | 0.79 | 0.82 | 0.79 | 0.88 | 0.82 | 0.76 | 0.82 |
| 10 | 0.91 | 0.5 | 0.79 | 0.64 | 0.91 | 0.91 | 0.82 | 0.91 | 0.82 | 0.82 | 0.91 |

TABLE XIII

Comparison of F1 measure under different walking speeds using OU-ISIR-A database without partitioning.

| Speed (km/h) | pHOC | LXP | LBP | SLBP | GEI[6] | GEI + PCA | LGXP | LGBP | SLGBP | Mean + std | proposed |
|---|---|---|---|---|---|---|---|---|---|---|---|
| 2 | 0.88 | 0.62 | 0.66 | 0.58 | 0.92 | 0.92 | 0.84 | 0.88 | 0.88 | 0.88 | 0.92 |
| 3 | 0.84 | 0.48 | 0.58 | 0.55 | 0.89 | 0.92 | 0.8 | 0.9 | 0.84 | 0.84 | 1 |
| 4 | 0.77 | 0.45 | 0.57 | 0.51 | 0.96 | 0.92 | 0.73 | 0.77 | 0.85 | 0.89 | 0.92 |
| 5 | 0.71 | 0.29 | 0.55 | 0.38 | 0.81 | 0.92 | 0.84 | 0.84 | 0.88 | 0.85 | 0.92 |

TABLE XIII-continued

Comparison of F1 measure under different walking speeds using OU-ISIR-A database without partitioning.

| Speed (km/h) | pHOC | LXP | LBP | SLBP | GEI[6] | GEI + PCA | LGXP | LGBP | SLGBP | Mean + std | proposed |
|---|---|---|---|---|---|---|---|---|---|---|---|
| 6 | 0.77 | 0.39 | 0.5 | 0.48 | 0.85 | 0.84 | 0.81 | 0.96 | 0.92 | 0.88 | 0.96 |
| 7 | 0.88 | 0.27 | 0.51 | 0.37 | 0.8 | 0.84 | 0.76 | 0.76 | 0.8 | 0.88 | 0.89 |
| 8 | 0.88 | 0.4 | 0.51 | 0.6 | 0.81 | 0.88 | 0.8 | 0.84 | 0.88 | 0.82 | 0.88 |
| 9 | 0.92 | 0.39 | 0.54 | 0.48 | 0.74 | 0.78 | 0.75 | 0.85 | 0.78 | 0.7 | 0.76 |
| 10 | 0.88 | 0.43 | 0.73 | 0.56 | 0.88 | 0.89 | 0.77 | 0.88 | 0.77 | 0.78 | 0.88 |

TABLE XIV

Comparison of correct classification rates (CCR) under different walking speeds using OU-ISIR-A database with different non-overlapping partitioning.

| Speed (km/h) | Holistic | 5 regions | 7 regions | 8 regions | 10 regions | 16 regions |
|---|---|---|---|---|---|---|
| 2 | 94.21 | 97.05 | 97.05 | 94.11 | 94.11 | 97.05 |
| 3 | 100 | 100 | 100 | 100 | 100 | 100 |
| 4 | 94.11 | 100 | 97.05 | 100 | 97.05 | 100 |
| 5 | 94.11 | 94.11 | 97.05 | 100 | 100 | 97.05 |
| 6 | 97.05 | 97.05 | 100 | 100 | 100 | 97.05 |
| 7 | 94.11 | 97.05 | 97.05 | 97.05 | 97.05 | 97.05 |
| 8 | 91.17 | 97.05 | 97.05 | 100 | 100 | 97.05 |
| 9 | 82.35 | 97.05 | 94.11 | 94.11 | 91.17 | 97.05 |
| 10 | 91.17 | 94.11 | 97.05 | 94.11 | 91.17 | 100 |

TABLE XV

Comparison of correct classification rates (CCR) under different walking speeds using OU-ISIR-A database with different overlapping partitioning.

| Speed (km/h) | Holistic | 5 regions | 7 regions | 8 regions | 10 regions | 16 regions |
|---|---|---|---|---|---|---|
| 2 | 94.11 | 97.05 | 97.05 | 91.17 | 91.17 | 97.05 |
| 3 | 100 | 100 | 100 | 97.05 | 97.05 | 97.05 |
| 4 | 94.11 | 100 | 100 | 97.05 | 100 | 97.05 |
| 5 | 94.11 | 91.17 | 97.05 | 100 | 100 | 97.05 |
| 6 | 97.05 | 97.05 | 100 | 100 | 100 | 97.05 |
| 7 | 94.11 | 97.05 | 97.05 | 97.05 | 97.05 | 97.05 |
| 8 | 91.17 | 100 | 100 | 97.05 | 100 | 97.05 |
| 9 | 82.35 | 94.11 | 91.17 | 91.17 | 91.17 | 97.05 |
| 10 | 91.17 | 97.05 | 94.11 | 94.11 | 91.17 | 100 |

By one embodiment, in order to evaluate the effect of speed variations on the performance of the gait recognition approach described herein, a group of experiments is designed as follows:

1. Setup A: All gallery and probe sets for all subjects under all speeds are merged into one training dataset except the speed to be tested. The excluded probe set is then used to evaluate the performance.
2. Setup B: Only gallery sets for all subjects under all speeds are merged and used to train the model. Then, probe sets of different speeds are used to evaluate the performance.
3. Setup C: All gallery and probe sets for all subjects under all speeds are merged into one training dataset. The performance is evaluated using 5-fold cross validation.

The results for Setup A and B are shown in Table XVI, whereas the per-class performance results for Setup C are shown in Table XVII.

TABLE XVI

Performance evaluation of the proposed method against walking speed variations of the subjects under surveillance using OU-ISIR-A database.

| | Training Setup | |
|---|---|---|
| Speed (km/h) | Setup A | Setup B |
| 2 | 100 | 100 |
| 3 | 100 | 100 |
| 4 | 100 | 100 |
| 5 | 100 | 100 |
| 6 | 97.05 | 97.05 |
| 7 | 94.11 | 94.11 |
| 8 | 100 | 97.05 |
| 9 | 91.17 | 94.11 |
| 10 | 91.17 | 88.23 |

TABLE XVII 5-fold cross validation of all subjects under surveillance using OU-ISIR-A database.

| Subject_ID | TP | FP | Precision | Recall | F-Measure |
|---|---|---|---|---|---|
| a | 1 | 0 | 1 | 1 | 1 |
| b | 0.944 | 0 | 1 | 0.944 | 0.971 |
| c | 0.889 | 0.007 | 0.8 | 0.889 | 0.842 |
| d | 0.944 | 0 | 1 | 0.944 | 0.971 |
| e | 0.944 | 0.003 | 0.895 | 0.944 | 0.919 |
| f | 1 | 0 | 1 | 1 | 1 |
| g | 0.944 | 0.002 | 0.944 | 0.944 | 0.944 |
| h | 1 | 0 | 1 | 1 | 1 |
| i | 0.833 | 0.005 | 0.833 | 0.833 | 0.833 |
| j | 0.889 | 0.003 | 0.889 | 0.889 | 0.889 |
| k | 1 | 0 | 1 | 1 | 1 |
| l | 1 | 0 | 1 | 1 | 1 |
| m | 0.944 | 0.003 | 0.895 | 0.944 | 0.919 |
| n | 0.944 | 0.002 | 0.944 | 0.944 | 0.944 |
| o | 0.778 | 0.003 | 0.875 | 0.778 | 0.824 |
| p | 0.889 | 0.005 | 0.842 | 0.889 | 0.865 |
| q | 0.944 | 0 | 1 | 0.944 | 0.971 |
| r | 1 | 0.003 | 0.9 | 1 | 0.947 |
| s | 1 | 0 | 1 | 1 | 1 |
| t | 0.944 | 0.003 | 0.895 | 0.944 | 0.919 |
| u | 0.889 | 0 | 1 | 0.889 | 0.941 |
| v | 1 | 0 | 1 | 1 | 1 |
| w | 0.944 | 0.008 | 0.773 | 0.944 | 0.85 |
| x | 0.944 | 0 | 1 | 0.944 | 0.971 |
| y | 0.944 | 0 | 1 | 0.944 | 0.971 |
| z | 1 | 0.002 | 0.947 | 1 | 0.973 |
| aa | 0.889 | 0 | 1 | 0.889 | 0.941 |
| bb | 1 | 0.003 | 0.9 | 1 | 0.947 |
| cc | 0.778 | 0 | 1 | 0.778 | 0.875 |
| dd | 0.944 | 0.002 | 0.944 | 0.944 | 0.944 |
| ee | 0.889 | 0.007 | 0.8 | 0.889 | 0.842 |
| ff | 0.889 | 0 | 1 | 0.889 | 0.941 |
| gg | 0.944 | 0.002 | 0.944 | 0.944 | 0.944 |
| hh | 1 | 0 | 1 | 1 | 1 |
| Overall | 0.938 | 0.002 | 0.942 | 0.938 | 0.938 |

Each of the functions of the above described embodiments may be implemented by an image processing device such as a gait recognizing device that includes circuitry which is configured to perform the functions recited herein.

Figure 3:
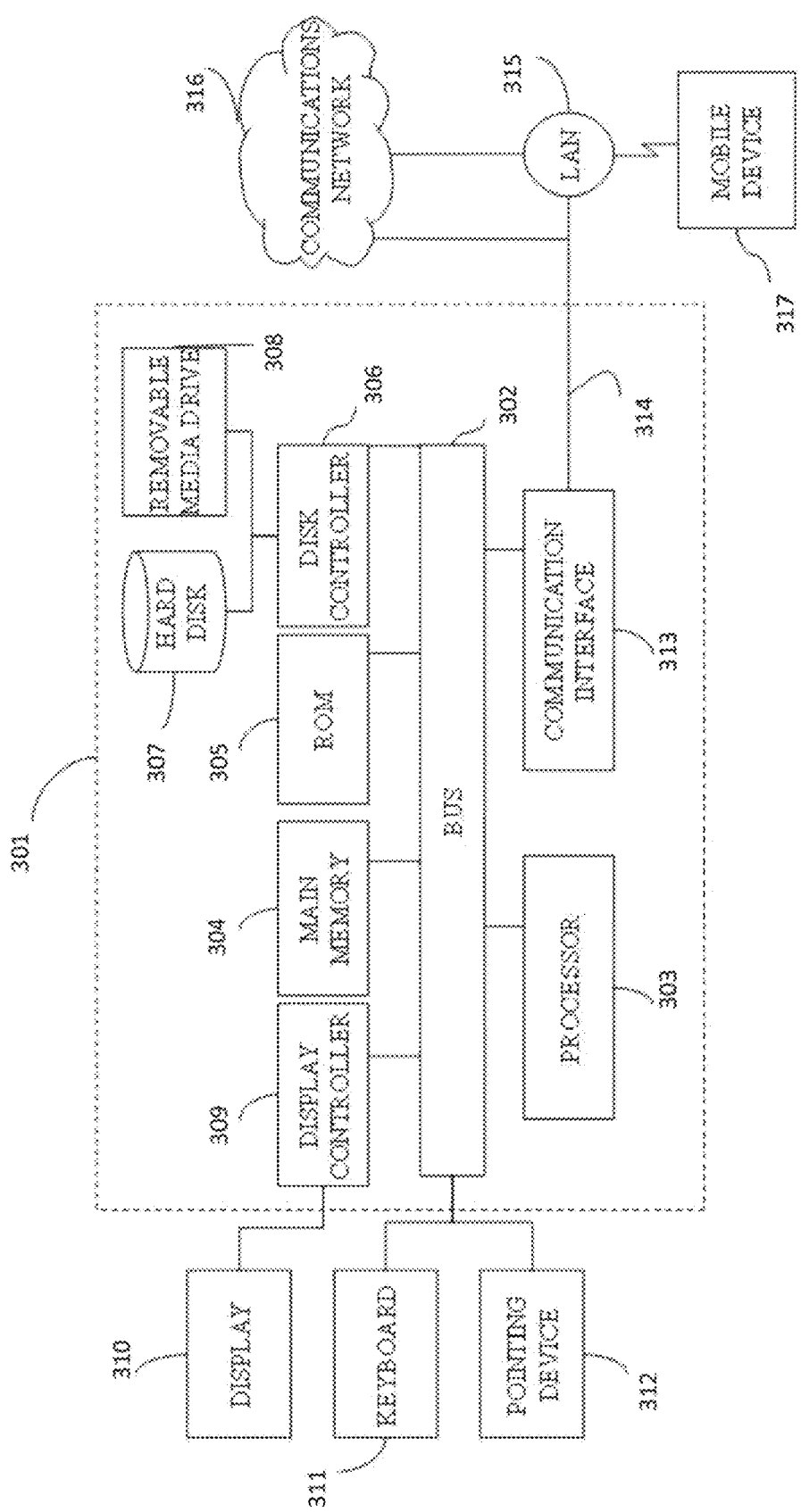
FIG. 3 illustrates an exemplary block diagram of a computing device.

Furthermore, each of the functions of the described embodiments may be implemented by one or more processing circuits. A processing circuit includes a programmed processor (for example, processor 303 in FIG. 3), as a processor includes circuitry. A processing circuit also includes devices such as an application-specific integrated circuit (ASIC) and circuit components arranged to perform the recited functions. The various features discussed above may be implemented by a computer system (or programmable logic). FIG. 3 illustrates such a computer system 301.

The computer system 301 includes a disk controller 306 coupled to the bus 302 to control one or more storage devices for storing information and instructions, such as a magnetic hard disk 307, and a removable media drive 308 (e.g., floppy disk drive, read-only compact disc drive, read/write compact disc drive, compact disc jukebox, tape drive, and removable magneto-optical drive). The storage devices may be added to the computer system 301 using an appropriate device interface (e.g. small computer system interface (SCSI), integrated device electronics (IDE), enhanced-IDE (E-IDE), direct memory access (DMA), or ultra-DMA).

The computer system 301 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 301 may also include a display controller 309 coupled to the bus 302 to control a display 310, for displaying information to a computer user. The computer system includes input devices, such as a keyboard 311 and a pointing device 312, for interacting with a computer user and providing information to the processor 303. The pointing device 312, for example, may be a mouse, a trackball, a finger for a touch screen sensor, or a pointing stick for communicating direction information and command selections to the processor 303 and for controlling cursor movement on the display 310.

The processor 303 executes one or more sequences of one or more instructions contained in a memory, such as the main memory 304. Such instructions may be read into the main memory 304 from another computer readable medium, such as a hard disk 307 or a removable media drive 308. One or more processors in a multi-processing arrangement may also be employed to execute the sequences of instructions contained in main memory 304. In alternative embodiments, hard-wired circuitry may be used in place of or in combination with software instructions. Thus, embodiments are not limited to any specific combination of hardware circuitry and software.

As stated above, the computer system 301 includes at least one computer readable medium or memory for holding instructions programmed according to any of the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 301, for driving a device or devices for implementing the invention, and for enabling the computer system 301 to interact with a human user. Such software may include, but is not limited to, device drivers, operating systems, and applications software. Such computer readable media further includes the computer program product of the present disclosure for performing all or a portion (if processing is distributed) of the processing performed in implementing any portion of the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 303 for execution. A computer readable medium may take many forms, including but not limited to, non-volatile media or volatile media. Non-volatile media includes, for example, optical, magnetic disks, and magneto-optical disks, such as the hard disk 307 or the removable media drive 308. Volatile media includes dynamic memory, such as the main memory 304. Transmission media, on the contrary, includes coaxial cables, copper wire and fiber optics, including the wires that make up the bus 302. Transmission media also may also take the form of acoustic or light waves, such as those generated during radio wave and infrared data communications.

Various forms of computer readable media may be involved in carrying out one or more sequences of one or more instructions to processor 303 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 301 may receive the data on the telephone line and place the data on the bus 302. The bus 302 carries the data to the main memory 304, from which the processor 303 retrieves and executes the instructions. The instructions received by the main memory 304 may optionally be stored on storage device 307 or 308 either before or after execution by processor 303.

The computer system 301 also includes a communication interface 313 coupled to the bus 302. The communication interface 313 provides a two-way data communication coupling to a network link 314 that is connected to, for example, a local area network (LAN) 315, or to another communications network 316 such as the Internet. For example, the communication interface 313 may be a network interface card to attach to any packet switched LAN. As another example, the communication interface 313 may be an integrated services digital network (ISDN) card. Wireless links may also be implemented. In any such implementation, the communication interface 313 sends and receives electrical, electromagnetic or optical signals that carry digital data streams representing various types of information.

The network link 314 typically provides data communication through one or more networks to other data devices. For example, the network link 314 may provide a connection to another computer through a local network 315 (e.g., a LAN) or through equipment operated by a service provider, which provides communication services through a communications network 316. The local network 314 and the communications network 316 use, for example, electrical, electromagnetic, or optical signals that carry digital data streams, and the associated physical layer (e.g., CAT 5 cable, coaxial cable, optical fiber, etc.). The signals through the various networks and the signals on the network link 314 and through the communication inter face 313, which carry the digital data to and from the computer system 301 may be implemented in baseband signals, or carrier wave based signals.

The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 301 can transmit and receive data, including program code, through the network(s) 315 and 316, the network link 314 and the communication interface 313. Moreover, the network link 314 may provide a connection through a LAN 315 to a mobile device 317 such as a personal digital assistant (PDA) laptop computer, or cellular telephone.

While aspects of the present disclosure have been described in conjunction with the specific embodiments thereof that are proposed as examples, alternatives, modifications, and variations to the examples may be made. It should be noted that, as used in the specification and the appended claims, the singular forms "a," "an," and "the" include plural referents unless the context clearly dictates otherwise.

What is claimed is:

1. A method of identifying a human subject by gait recognition, the method comprising:

obtaining a number of image frames of the human subject showing the human subject's walking style and storing the image frames in a memory;

receiving by circuitry a gait sequence, the gait sequence including a predetermined number of the image frames of the human subject;

processing by circuitry, the received gait sequence to generate a gait-energy-image (GEI), wherein the GEI is a sum of walking silhouette images divided by the number of the image frames;

computing by circuitry, a plurality of Gabor filter responses by convoluting the generated GEI with a bank of Gabor filters, the filter bank including a first predetermined number of unique scales, and a second predetermined number of unique orientations, partitioning by circuitry, each Gabor filter response of the computed plurality of Gabor filter responses, into a predetermined number of overlapping regions, wherein the partitioning separates the walking silhouette images into moving parts of the human subject selected from the group consisting of a head, an arms, a leg and a torso;

extracting by circuitry, a predetermined number of statistical features only from the overlapping regions, the extracted statistical features corresponding to texture content of the subject; and identifying by circuitry, the human subject based on a classification of the extracted statistical features.

2. The method of claim 1, wherein the first predetermined number of scales is five and the second predetermined number of orientations is eight.

3. The method of claim 2, wherein a magnitude of the plurality of Gabor filter responses is equal to a scalar multiplication of the first predetermined number and second predetermined number.

4. The method of claim 1, wherein each overlapping region of the predetermined number of overlapping regions has a unique size.

5. The method of claim 1, wherein the predetermined number of extracted statistical features is eight, the extracted statistical features including a mean, a standard deviation, energy content, correlation, contrast, entropy, homogeneity, and smoothness.

6. The method of claim 1, further comprising:

merging by circuitry, the predetermined number of extracted statistical features to form a global feature vector.

7. The method of claim 1, wherein the classification is performed based on a SVM classifier.

\* \* \* \* \*